United States Patent [19]

Liles et al.

[11] Patent Number: 5,438,097
[45] Date of Patent: Aug. 1, 1995

[54] POLYSTYRENE MODIFIED WITH SILICONE RUBBER POWDER

[76] Inventors: Donald T. Liles, 1205 Wakefield, Midland, Mich. 48640; Kenneth M. Lee, 2417 25th St., Bay City, Mich. 48708; David J. Romenesko, 4102 Elm Ct., Midland, Mich. 48640; James W. White, 22 Heol Pentr'r Felin, Llantwit Major, South Glamorgan, CE61, 2XS, Wales, United Kingdom; David L. Murray, 1411 W. Hines St., Midland, Mich. 48640

[21] Appl. No.: 183,003

[22] Filed: Jan. 18, 1994

Related U.S. Application Data

[63] Continuation-in-part of Ser. No. 814,860, Dec. 30, 1991, abandoned.

[51] Int. Cl.⁶ ............................................. C08L 51/00
[52] U.S. Cl. ................................ 525/63; 525/106; 525/479; 528/34; 528/25
[58] Field of Search ............... 525/63, 479, 106; 528/34, 25

[56] References Cited

U.S. PATENT DOCUMENTS

| | | | |
|---|---|---|---|
| 3,879,491 | 4/1975 | Lindsey et al. | 525/479 |
| 3,923,923 | 12/1975 | Fiedler | 525/479 |
| 4,070,414 | 1/1978 | Falender et al. | 525/479 |
| 4,071,577 | 1/1978 | Falender et al. | 525/479 |
| 4,226,761 | 10/1980 | Cooper et al. | 524/141 |
| 4,618,642 | 10/1986 | Schoenher | 524/425 |
| 4,690,986 | 9/1987 | Sasaki et al. | 525/479 |
| 4,939,205 | 7/1990 | Derudder et al. | 525/63 |
| 4,939,206 | 7/1990 | Wang | 525/63 |
| 4,954,565 | 9/1990 | Liles | 524/860 |
| 5,047,472 | 9/1991 | Alsamarraie | 525/68 |

OTHER PUBLICATIONS

Journal of Polymer Science: Polymer Chemistry Edition vol. 20, 3351–3368 (1982).
European Polymer Journal, vol. 24 No. 9 . 913–916 (1988).
Encyclopedia of Polymer Science and Engineering, vol. 16, Styrene Polymers to Toys; pp. 62–64; John Wiley & Sons.

*Primary Examiner*—Ralph H. Dean

[57] ABSTRACT

A crumb-like silicone rubber powder is uniformly dispersed in a polystyrene polymer using conventional equipment, such as a twin screw extruder, to provide a resin having up to a ten fold improvement in impact strength over the unmodified polymer. The novel silicone rubber powder of the invention is prepared by isolating the particles obtained from a polymerization of an unsaturated monomer in the presence of an aqueous emulsion of a hydroxyl-functional polydiorganosiloxane which has been precured using an organotin curing catalyst and a crosslinker which contains unsaturated functionality.

22 Claims, No Drawings

POLYSTYRENE MODIFIED WITH SILICONE RUBBER POWDER

This is a continuation-in-part of application Ser. No. 07/814,860, filed Dec. 30, 1991; now abandoned.

FIELD OF THE INVENTION

The present invention relates to polystyrene polymer compositions having high impact strength. More particularly, the invention relates to polystyrene polymers which are modified with a silicone rubber powder prepared by polymerizing an unsaturated monomer in the presence of an aqueous emulsion of a precured polydiorganosiloxane.

BACKGROUND OF THE INVENTION

Polystyrene (PS) is one of the largest volume thermoplastic resins in commercial production today. This ubiquitous material is well suited to many "low performance" applications wherein its brittle nature is of little consequence. Additionally, many other applications requiring greater impact resistance have been uncovered by the advent of various modifications of these plastics. Thus, styrene-based copolymers, and particularly PS resins which are modified with organic rubber particles, have been a commercially viable alternative to some of the more exotic and expensive engineering plastics for certain applications.

One such system, known in the art as high impact polystyrene (HIPS), can have an impact strength which is an order of magnitude greater than the virgin resin but suffers from poor thermal stability, particularly in the presence of oxygen. These modified PS resins are typically prepared by polymerizing a solution of an unsaturated organic rubber, such as polybutadiene, in styrene monomer.

The addition of various rubber compositions to other thermoplastic resin systems has also proved beneficial. For example, Japanese Kokai Patent Application No. Hei 2(1990)-263861 to Mitsubishi Rayon Co., Ltd. discloses a thermoplastic resin composition having a high impact strength, high heat resistance and good resistance to organic solvents. This composition comprises a blend of polyphenylene ether (PPE) resin, a polyester resin and a rubber-like elastomer and/or modified rubber-like elastomer. A preferred elastomer component of this prior art disclosure is obtained by the graft copolymerization of at least one vinyl monomer with a composite rubber consisting of a silicone rubber and a polyalkyl methacrylate "interlocked with each other in an inseparable way." In the production of the composite rubber component, a cyclic diorganosiloxane is emulsion polymerized with a crosslinker and, optionally, with a graft crosslinking agent using a sulfonic-acid-series emulsificating agent. In a subsequent step, a combination of an alkyl (meth) acrylate, a crosslinker and a graft crosslinking agent is used to swell the silicone particles of the above emulsion and an initiator is then introduced to polymerize this system.

In a similar approach, U.S. Pat. No. 5,047,472 to Alsamarraie et al. teaches thermoplastic molding compositions comprising PPE resin, or a PPE resin containing a polystyrene resin, which is modified with a multistage polyorganosiloxane/vinyl-based graft polymer. These compositions are stated to have improved impact resistance, flame resistance and moldability. In this case, the graft copolymer is prepared by a "co-homopolymerization" technique wherein an emulsion containing a diorganosiloxane, a crosslinker and a graft-linker is polymerized concurrently with the polymerization of a vinyl monomer. The resulting first stage polymeric co-homopolymerized substrate is then grafted with a vinyl polymer in at least one subsequent stage. This multi-stage polydiorganosiloxane polyorganosiloxane/vinyl-based graft polymer formed according to the methods described by Alsamarraie et al. was also employed by Derudder et al. in U.S. Pat. No. 4,939,205 to augment the impact resistance of polycarbonate resin compositions. The graft polymer was further used by Wang in U.S. Pat. No. 4,939,206 to modify various thermoplastic resins with the object of providing flame retardant compositions having improved impact resistance.

U.S. Pat. No. 4,690,986 to Sasaki et al. teaches a thermoplastic resin composition having improved impact strength, achieved by combining a silicone rubber powder with an organic monomer. The silicone rubber powder is obtained by an emulsion co-polymerization of a polydiorganosiloxane oligomer, a tetra functional silane crosslinker and a grafting silane. However, the method of the present invention also differs from the method taught by Sasaki et al. at in least three key respects. First, Sasaki et al. and the comparative experiment include a tetrafunctional crosslinking agent, whereas this component is missing in the method of the application. Second, the 3-methacryloxypropyltrimethoxysilane, polydimethylsiloxane and tetrafunctional crosslinker are mixed and copolymerized in the emulsion of the comparative example and in the method of Sasaki et al. These latter methods lead to a random distribution of crosslinks across the backbone of the emulsion copolymer, because either the grafting silane or the tetrafunctional crosslinker can attach at any point along the backbone of the siloxane molecule. In the method of the present invention, an emulsion polymer having a molecular weight greater than 50,000 is first formed and only then crosslinked in a condensation reaction with a trifunctional silane. Moreover, the condensation reaction of the present invention takes place in the presence of a tin catalyst, which is not disclosed in the Sasaki et al. The condensation reaction of the present invention results in a controlled distribution of crosslinks since crosslinking takes place only at the polymer chain ends. The average molecular weight between crosslinks would therefore, be expected to be greater than that of the corresponding emulsions of the comparative experiment and those of Sasaki et al.

SUMMARY OF THE INVENTION

It has now been discovered that certain silicone rubber powders can be used to advantageously modify polystyrene resins and thereby impart improved impact resistance to the PS resins. The particular silicone rubber powder used in this modification is produced by polymerizing an unsaturated monomer in the presence of an aqueous emulsion of precured polydiorganosiloxane particles, whereupon the resulting particles are harvested from the emulsion. For its part, the aqueous polydiorganosiloxane emulsion employed is produced according to the methods disclosed by Liles in U.S. Pat. No. 4,954,565 and by Schoenherr in U.S. Pat. No. 4,618,642. Unlike the polydiorganosiloxane emulsions of the prior art cited above, wherein the particles of the polydiorganosiloxane emulsion are concurrently polymerized and crosslinked, the instant systems are based on an emulsion wherein a diorganosiloxane is first polymerized and subsequently crosslinked. It has surprisingly been found that a substantial improvement in the impact resistance of polystyrene polymers is obtained when the silicone rubber powder used to modify PS is made from particles of the precured polydiorganosiloxane emulsions taught by Liles and Schoenherr and subsequently modified with the unsaturated monomer rather than from an emulsion wherein diorganosiloxanes are simultaneously polymerized and crosslinked. Moreover, the instant method does not contemplate the inclusion of the vinyl monomer required in the first stage polymeric co-homopolymerized substrate as taught by Alsamarraie et al., Derudder et al. and Wang, cited supra. This further simplifies the production of the silicone rubber powder which is used to modify the PS resins of the invention.

Polystyrene resins modified with the silicone rubber powders of the present invention exhibit up to a ten-fold improvement in impact resistance over the virgin polystyrene. The rubber powders of the present invention are also readily dispersible in the polystyrene resins using conventional process equipment, such as a twin screw extruder. This offers a significant advantage to a plastics manufacturer since both resin and modifying rubber ingredients can be handled as particulate solid feeds and are therefore amenable to facile introduction to mixing equipment (e.g., from a hopper). These powdered rubbers can also be formulated as a "master batch" and used as a concentrate to further modify styrenic plastics.

The present invention therefore relates to a composition consisting essentially of a uniform blend of
(A) a polystyrene polymer; and
(B) a silicone rubber powder uniformly dispersed in said polystyrene polymer, said silicone rubber powder being prepared by the steps comprising
(I) forming an aqueous emulsion consisting essentially of a plurality of particles of a hydroxyl-terminated polydiorganosiloxane having a weight average molecular weight greater than 50,000,
(II) precuring the polydiorganosiloxane particles within said emulsion with an organotin curing catalyst and a crosslinker selected from the group consisting of a silane having the general formula QSi(X)$_3$ and partial hydrolysis condensation products thereof, wherein X is a hydrolyzable group selected from the group consisting of alkoxy radicals having 1 to 6 carbon atoms, chloro, hydrido, acetoxy, diorganoamino, oximato and amido groups and in which Q represents a monovalent radical which contains an unsaturated group,
(III) thereafter polymerizing an unsaturated monomer in the presence of the emulsion of precured polydiorganositoxane particles formed in step (II), and
(IV) harvesting the particles resulting from step (III), wherein said composition contains from 5 to 50 parts by weight of said polydiorganosiloxane for each 100 parts by weight of said polystyrene polymer.

DETAILED DESCRIPTION OF THE INVENTION

The polystyrene (PS) polymer (A) of the present invention is well known in the art and is a homopolymer or copolymer of styrenic monomers. For the purposes of the present invention, styrenic monomers are substituted or unsubstituted versions of the basic structure

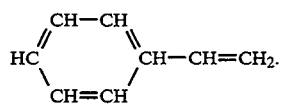

Examples of such monomers are styrene, alpha-methylstyrene, chloromethylstyrene, and divinyl benzene, inter alia. These monomers are well known in the art and further description thereof is not considered necessary, the interested reader being referred to pages 1–246 of volume 16 of the "Encyclopedia of Polymer Science and Engineering" published by John Wiley & Sons (1989).

General purpose polystyrene, which is basically an atactic homopolymer, is the most commercially significant PS type and is a preferred component (A). It is, however, also contemplated that the less prevalent syndiotactic and isotactic homopolymers, as well as copolymers of styrene with such monomers as acrylates, acrylonitrile and butadiene, also derive significant benefit from modification according to the present invention.

Component (B) is a silicone rubber powder which is prepared by harvesting precured silicone emulsion particles, which particles have an unsaturated monomer copolymerized therewith. This component is prepared by the following sequence.

First, an aqueous silicone emulsion (i) of a hydroxyl-terminated polydiorganosiloxane is prepared by methods well known in the art. In addition to the polydiorganosiloxane and water, component (i) also contains at least one surfactant which stabilizes the dispersed polydiorganosiloxane particles in the emulsion. In order to achieve the intended impact modification characteristics, described infra, the polydiorganosiloxane particles of this emulsion should have an average size of about 0.1 to about 10 microns, preferably from about 0.5 to about 1 micron and be characterized by a weight average molecular weight of greater than about 50,000, preferably greater than 100,000. It is preferred that the above described emulsion have a solids content ranging from about 20 to about 70 weight percent, most preferably about 65%.

These emulsions are well known in the art and may be prepared, for example, by methods wherein cyclic or linear diorganosiloxane species are dispersed in an aqueous continuous phase with the aid of the above mentioned surfactant and are thereafter emulsion polymerized by the introduction of an acid or base catalyst. These methods can be illustrated by the disclosures of U.S. Pat. No. 3,294,725 to Findlay et al. and U.S. Pat. No. 2,891,920 to Hyde et al., among others. In preferred embodiments of emulsion (i), the surfactant employed is an anionic type, such as sodium lauryl sulfate or ammonium lauryl sulfate, and the catalyst is dodecylbenenzene sulfonic acid, the latter also acting as a surfactant in the system.

For the purposes of the present invention, the organic groups of the polydiorganosiloxane of emulsion (i) are independently selected from hydrocarbon or halogenated hydrocarbon radicals such as alkyl and substituted alkyl radicals containing from 1 to 20 carbon atoms; cycloalkyl radicals, such as cyclohexyl; and aromatic hydrocarbon radicals, such as phenyl, benzyl and tolyl. Preferred organic groups are lower alkyl radicals containing from 1 to 4 carbon atoms, phenyl, and halogen-substituted alkyl such as 3,3,3-trifluoropropyl. Thus, the polydiorganosiloxane can be a homopolymer, a copolymer or a terpolymer containing such organic groups. Examples include systems comprising dimethylsiloxy units and phenylmethylsiloxy units; dimethylsiloxy units and diphenylsiloxy units; and dimethylsiloxy units, diphenylsiloxy units and phenylmethylsiloxy units, among others. Most preferably, the polydiorganosiloxane is a polydimethylsiloxane which is terminated with a hydroxyl group at each end of its molecule.

In the second step in the production of the silicone rubber powder, an organotin curing catalyst (ii) and a crosslinker (iii) are added to the above described aqueous emulsion (i) to crosslink the hydroxyl-terminated polydiorganosiloxane particles dispersed therein.

The organotin curing catalyst (ii) is an organic salt of tin and may be illustrated by tin (II) carboxylates, such as stannous oleate and stannous naphthanate; dialkyl tin (IV) carboxylates, such as dibutyltin diacetate and dibutyltin dilaurate; and tin (IV) stannoxanes, as exemplified by the structure $(Bu)_2SnCl-O-(Bu)_2OH$, in which Bu denotes a butyl radical, as taught by Stein et al. in U.S. Pat. No.5,034,455. In preferred embodiments, catalyst (ii) is stannous octoate.

Crosslinker (iii) is a silane having the general formula $QSi(X)_3$ 

or a partial hydrolysis condensation product thereof. In the above formula, X is a hydrolyzable group selected from the group consisting of alkoxy radicals having 1 to 6 carbon atoms, chloro, hydrido, acetoxy, diorganoamino of the structure $-NR_2$, oximato of the structure $ON=CR_2$ or amido of the structure $-N(R)-C(O)R$, in which each R is independently selected from hydrogen, alkyl radicals having 1 to 6 carbon atoms or a phenyl radical and Q represents a monovalent radical which contains at least one unsaturated group capable of free-radical polymerization, preferably having the structure $-CA=CH_2$, in which A is hydrogen or an alkyl radical having 1 to 6 carbon atoms. This group is attached to the silicon atom of the crosslinker through a divalent organic connecting group having up to about 6 carbon atoms. The exact nature of this connecting group is not critical as long as it does not interfere with the other components and operations of the invention.

Preferably, the crosslinker is a silane having the general formula $Q'Si(OR')_3$ 

in which R' is an alkyl radical having 1 to 6 carbon atoms, and Q' is selected from the group consisting of acryloxypropyl, methacryloxypropyl, vinyl, allyl, hexenyl, acrylamidopropyl and a moiety containing vinylbenzyl functionality. In highly preferred silane crosslinkers, R' is a methyl radical and Q' is a methacryloxypropyl group. Specific examples of suitable silane crosslinkers include gamma-acryloxypropyltrimethoxysilane, gamma-methacryloxypropyltrimethoxysilane, vinyltrimethoxysilane, 5-hexenyltrimethoxysilane, allyltrimethoxysilane, acrylamidopropyltrimethoxysilane, and silanes represented by the formulas

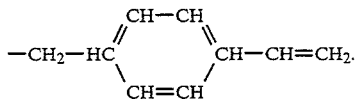

and $HCl \cdot ZN(H)-CH_2CH_2-N(H)-CH_2CH_2CH_2-Si(OMe)_3$, wherein Me hereinafter denotes a methyl radical and Z is a vinylbenzyl group having the formula

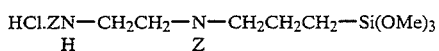

Although order of addition in this second step is not considered critical, it is preferred to first add from about 0.05 to about 2 parts by weight, preferably from about 0.3 to about 0.6 parts, of the catalyst (ii) to 100 parts by weight of the hydroxyl-terminated polydiorganosiloxane in emulsion (i). From about 0.1 to about 10 parts by weight, preferably about 1 part, of the crosslinker (iii) is then added to this mixture for each 100 parts by weight of the polydiorganosiloxane and the resultant emulsion is allowed to age to precure the polydiorganosiloxane within the emulsion. When the silane crosslinker content is less than about 0.1 part, incomplete cure is observed; when this component exceeds about 10 parts, the byproducts formed when the hydrolyzable group X is reacted destabilize the emulsion. During the aging process, which can take place at room temperature as well as at elevated temperatures, the pH of the emulsion should be maintained between about 4 and 10.5. Aging is deemed sufficient when an aliquot of the emulsion forms an elastomeric film after being cast upon a substrate and dried thereon. In order to be within the scope of the invention, this elastomeric film must only be swollen by a good solvent for the polydiorganosiloxane (such as hexane or toluene) but must not be totally dissolved thereby. Generally, the gel fraction of this film should be greater than about 50 weight percent and preferably in the range of 80 to 90% by weight.

Further details regarding the above three steps used to prepare the silicone rubber powder of the invention may be found in previously cited U.S. Pat. No. 4,618,642 to Schoenherr and U.S. Pat. No. 4,954,565 to Liles, which patents teach these precured systems in combination with fillers for use as elastomeric coatings. The disclosures of these patents are hereby incorporated by reference to teach the above emulsions.

In a third step, at least one unsaturated monomer (iv) is polymerized in the presence of the emulsion of precured polydiorganosiloxane particles formed in the second step. The unsaturated groups of this monomer must be capable of reacting with the unsaturated groups of the silane crosslinker (iii). Further, the monomer (iv) is selected such that, when it is homopolymerized using a conventional free-radical initiator, it results in a polymer having a glass transition temperature of at least 0° C. Preferably, component (iv) is a styrenic monomer of the type described in connection with component (A). Examples of other suitable unsaturated monomers include acrylates, methacrylates, acrylonitrile and vinyl acetate.

In a preferred procedure for the third step, a free-radical initiator (iv) is added to the emulsion resulting from the above described second step and at least one unsaturated monomer, preferably a styrenic monomer, is gradually introduced. The preferred styrenic monomer is of the same type described above for use in the manufacture of component (A) and is compatible therewith. Most preferably, it is chemically identical to the monomer used to produce component (A). It is preferred that from about 10 to about 80 parts by weight, most preferably from about 25 to about 55 parts by weight, of the unsaturated monomer is added to the emulsion based on 100 parts by weight of the polydiorganosiloxane content thereof.

Suitable initiators to be used in this third step are those which are known to polymerize the unsaturated monomer (iv). These include azo compounds, such as azobisisobutyronitrile and 2-2'-azobis(2-methylbutyronitrile), organic peroxides, such as acetyl peroxide, cumene hydroperoxide and benzoyl peroxide, and inorganic compounds such as potassium persulfate and ammonium peroxydisulfate, the azo compounds being preferred. The initiator is typically employed at a level of about 0.05 to about 0.2 parts by weight for each 100 parts by weight of the monomer (iv) and is introduced as an organic solvent solution or, preferably, admixed with a portion of the monomer. In this polymerization step, the emulsion containing the initiator is preferably stirred at a temperature of about 60° to about 70° C. while the monomer is slowly added thereto, a typical addition period being in the range of 2 to 3 hours at the above noted temperatures, whereupon the resulting emulsion is heated for an additional 2 to 3 hours.

The fourth, and final, step in the preparation of the silicone rubber powder of the invention involves the "harvesting" or isolation of the above prepared particles from the emulsion. This can be accomplished by first coagulating the particles by any of the standard methods for breaking emulsions, such as freezing, freeze drying, spray drying or the addition of a salt such as calcium chloride. A favored method is one wherein the above formed emulsion is added, at room temperature, to a stirred excess of a water-soluble organic solvent such as acetone, ethylene glycol, ethanol or isopropyl alcohol, the later being preferred. The precipitated particles are then filtered and dried to form a crumb-like silicone rubber powder (B).

A composition of the present invention may then be prepared by thoroughly dispersing silicone rubber powder (B) in polystyrene polymer (A) at such a level that from about 5 to about 50 parts by weight of the polydiorganosiloxane present in (B) are present for each 100 parts by weight of the polystyrene (A). This mixing can be accomplished at elevated temperatures by any of the conventional methods used to disperse various components in thermoplastic resins. The temperature and other conditions to be used in such a mixing operation depend on the particular polymer selected and may be determined by routine experimentation by those skilled in the art. For example, the polystyrene polymer may be mixed according to this method at a temperature from about 180° C. to about 210° C. Alternatively, the silicone rubber powder can be premixed with the polystyrene polymer, which mixture is then fed to an extruder. Examples of suitable equipment for this purpose include such machines as twin screw extruders and single screw extruders, inter alia. In order to obtain optimum impact resistance in the modified PS polymer, sufficient silicone rubber powder is used so as to result in a polydiorganosiloxane content of about 10 to about 25 parts by weight for each 100 parts by weight of the polystyrene.

After components (B) and (A) are thoroughly mixed to provide a uniform blend, this composition can be further processed by conventional techniques, such as extrusion, vacuum forming, injection molding, blow molding or compression molding, to fabricate plastic parts which have significantly improved impact resistance over the unmodified polymer. It is also contemplated herein that the compositions of the invention may further contain fillers and other additives normally employed in conventional styrenic polymers of the art. It is preferred that these systems contain a glass fiber filler which further improves the mechanical properties of fabricated products, particularly when a silane coupling agent is also used, as well known in the art.

The compositions find utility in various industrial applications where improved toughness is desired in a PS polymer system. Examples include electrical and electronic insulation components, such as motor, coil and transformer insulation; housings for various electrical and electronic equipment, such as machines and hand tools; structural members, such as foam board insulators; furniture; automotive components, such as engine and interior structural components; aircraft interior components; and freezer-to-oven cookware, inter alia.

EXAMPLES

The following examples are presented to further illustrate the compositions of this invention, but are not to be construed as limiting the invention, which is delineated in the appended claims. All parts and percentages in the examples are on a weight basis and all measurements were obtained at 25° C., unless indicated to the contrary.

Example 1

A silicone rubber powder was prepared by first forming an anionically stabilized, non-crosslinked aqueous emulsion of hydroxyl-terminated polydimethylsiloxane having a molecular weight (Mw) of approximately 250,000 and a percent solids content of about 65% by weight according to the method of Example 1 of previously cited U.S. Pat. No. 4,618,642 to Schoenherr.

To 428 g of the above described emulsion was added dropwise with stirring 2 g of stannous octoate. Next 4.8 g of 3-methacryloxypropyltrimethoxysilane was added dropwise with stirring. 15 minutes after addition of the silane, the emulsion was diluted with 400 g of water and allowed to remain undisturbed for 16 hours. 500 g of water was then added and the emulsion was heated to 50 C. with stirring under a nitrogen purge. 0.1 g of azobisisobutryonitrile (AIBN) in 2.7 g of styrene was added to the emulsion followed by the dropwise addition of additional styrene monomer over a 4 hour period while the temperature was maintained between 50 and 65 C. such that the total amount of styrene monomer added to the emulsion was 100 g. After addition of the styrene monomer, the emulsion was heated (between 50 and 65 C.) and stirred for an additional 30 minutes after which it was allowed to cool to 25 C. Stirring was stopped and the emulsion was allowed to remain undisturbed for 2 days at 25 C. The emulsion was coagulated and silicone rubber powder was harvested by pouring the emulsion into 2343 g of isopropyl alcohol, washing the solids with water and allowing the resulting crumb rubber to dry in ambient air. 378.6 g of silicone rubber powder was obtained and it had a measured polydimethylsiloxane content (bomb digestion method) of 74.3 weight percent.

The above silicone rubber powder was used to modify a general purpose polystyrene (PS) polymer (STYRON TM 685D; Dow Chemical Co., Midland, Mich.) using a Haake System 90 TW100 extruder (Haake/Fisons Instruments, Paramus, N.J.) to form a variety of compositions containing from about 11 to 33 parts of polydimethylsiloxane per 100 parts of PS. The extruder conditions employed were:

Feed zone 1 temperature = 180° C.;
Mixing zone 2 temperature = 210° C.;
Mixing zone 3 and exit zone 4 temperature = 210° C.;
Screw speed = 50 revolutions per minute (rpm);
Die = ⅛ inch diameter strand die.

The extrudate from the above mixing operation was cooled, chopped into pellets, dried for 2.5 hours at 100° C. and fabricated into impact test bars measuring ⅛×5×⅛ inch using a Boy model 15S screw-type injection molding machine (Boy Machine Corp., Exton, Pa.). The molding parameters used were:

Mixing zone 1 temperature = 400° F.
Mixing zone 2 temperature = 465° F.
Nozzle zone 3 dial setting = 52.
Mold temperature = 110° F.
Injection pressure = 1,800 psi.
Screw discharge set point = 3.0.
Mold clamp pressure = 3,700 psi.
Screw speed = 100 rpm.
Shot size dial = 36.
Mold time = 30 seconds.

The above described impact bars were notched and tested for Izod impact strength according to ASTM D 256 (American Society for Testing Materials). Impact resistance of the molded and notched test bars derived therefrom is presented in Table 1, wherein the first column indicates the calculated parts by weight of polydimethylsiloxane present in the modified PS system per 100 parts by weight of polystyrene polymer, and the second column indicates the actual weight percent of polydimethylsiloxane in the polystyrene polymer.

TABLE 1

| Parts Polydimethylsiloxane Per 100 Parts of Polystyrene Polymer | Percent Polydimethylsiloxane in Modified Polystyrene Polymer | Notched Izod Impact Strength (ft-lb/inch) |
| --- | --- | --- |
| 0 (Control) | 0 | 0.23 |
| 11 | 10 | 1.21 |
| 15 | 13 | 1.35 |
| 18 | 15 | 2.25 |
| 21 | 17 | 1.96 |
| 25 | 20 | 2.14 |
| 33 | 25 | 1.68 |

Example II

A comparative silicone rubber powder was prepared according to the general method shown in Example 1 above, with the exception that a tetrafunctional crosslinker was included and this component was mixed with the polydimethylsiloxane oligomer and 3-methacryloxypropyltrimethoxysilane prior to an emulsion copolymerization step using an acid catalyst, as suggested in U.S. Pat. No. 4,690,986 to Sasaki et al. The details of this preparation are as follows.

Seven hundred and nineteen grams of a hydroxyl end-blocked polydimethylsiloxane oligomer having a viscosity of about 80 cP at 25° C. (i.e., a weight average molecular weight of about 5,000), 7.19 g of tetraethylorthosilicate and 11.87 g of 3-methacryloxypropyltrimethoxysilane, were mixed for 5 minutes to effect solution. To this mixture there was added 27.8 g of 30 weight percent aqueous solution of sodium lauryl sulfate and 320 g of deionized water and this combination was stirred for 30 minutes. The resulting dispersion was homogenized by passing it twice through a Microfluidics Microfluidizer at 8,000 psi. To the resulting emulsion there was added 4.4 g of dodecylbenzenesulfonic acid. This combination was shaken for several minutes and then allowed to remain undisturbed at room temperature for 48 hours. The emulsion was neutralized to about pH = 8 with stirring using 50 weight % aqueous diethylamine. The emulsion consisted of crosslinked, copolymeric polydimethylsiloxane having methacrylate functionality. Evaporation of the water from a portion of this emulsion resulted in a elastomeric film.

The above precured emulsion (290.3 g) was diluted with 371.6 g of water and 0.15 g of 2-2'-azobis(2-methylbutyronitrile) dissolved in 2.9 ml of styrene was mixed therewith. The emulsion was stirred and heated under nitrogen to 65° C., whereupon 77.4 g of styrene was added to the emulsion at a rate of 0.6 cc/min. After all of the styrene had been added, the emulsion was maintained at 65° C. for an additional three hours, with stirring, after which it was allowed to stand overnight at room temperature. This emulsion was added to an equal volume of isopropyl alcohol and stirred for 15 minutes to effect coagulation. The mixture was filtered and the particles washed with fresh isopropyl alcohol followed by drying in air for 24 hours and at 1-2 mm Hg for 16 hours at room temperature. The resulting silicone rubber powder was found to contain 75.3 weight percent polydimethylsiloxane.

49 g of the above silicone rubber powder was added to 320 g of general purpose polystyrene and this composition was extruded, chopped and injection molded using the procedure described in Example 1 of the above identified application. The modified polystyrene, which contained 10 weight percent polydimethylsiloxane, was tested as described in Example 1 of the application and it exhibited an Izod impact strength of 0.63 ft-lb/in.

A second sample was also prepared, consisting of 80 grams of the above silicone rubber powder added to 320 g of general purpose polystyrene. This composition was extruded, chopped and injection molded using the procedure described in Example 1 of the above identified application. The modified polystyrene, which contained 15 weight percent polydimethylsiloxane, was tested as described in Example 1 of the application and it exhibited an Izod impact strength of 0.86 ft-lb/in.

A comparison of the values obtained using the methods described in U.S. Pat. No. 4,690,986 to Sasaki et al with those of the present invention shows that the composition taught by the present invention has dramatically improved impact properties for equivalent weight percentages of silicon crumb rubber. The impact values of polystyrene modified with 10% of silicon crumb rubber of the present invention shows an impact resistance of 1.21 ft-lb/in as shown in Table 1. This is double the impact resistance of the polystyrene modified with the crumb rubber of Sasaki et al, which exhibited an Izod impact strength of 0.63 ft-lb/in. Likewise, the impact values of polystyrene modified with 15% of silicon crumb rubber of the present invention shows an impact resistance of 2.25 ft-lb/in., a significant improvement over the impact resistance of the polystyrene modified with the crumb rubber of Sasaki et al, at 0.86 ft-lb/in.

We claim:

1. A composition consisting essentially of a blend of
   (A) a polystyrene polymer; and
   (B) a silicone rubber powder uniformly dispersed in said polystyrene polymer, said silicone rubber powder being prepared by the steps comprising
   (I) forming an aqueous emulsion consisting essentially of a plurality of particles of a hydroxyl-terminated polydiorganosiloxane having a weight average molecular weight greater than 50,000;
   (II) precuring the polydiorganosiloxane particles within said emulsion with an organotin catalyst and a silane having the general formula: and partial hydrolysis condensation products thereof to produce a non-cross linked, end-capped polymer, wherein X is a hydrolyzable group selected from the group consisting of alkoxy radicals having 1 to 6 carbon atoms, chloro, hydrido, acetoxy, diorganoamino, oximato and amido groups and in which Q represents a monovalent radical which contains an unsaturated group;
   (III) thereafter co-polymerizing an unsaturated monomer onto said end-capped non-crosslinked emulsion polymer formed in step (II); and
   (IV) harvesting the particles resulting from step (III), said silicone rubber powder is present in an amount such that the polysiloxane content is in the range of 5 to 50 parts by weight for each 100 parts by weight of said polystyrene polymer.

2. The composition according to claim 1, wherein said polydiorganosiloxane is a polydimethylsiloxane which is terminated with a hydroxyl group at each end of its molecule and said unsaturated monomer is a styrenic monomer.

3. The composition according to claim 2, wherein said silane is represented by the formula

in which R' is an alkyl radical having 1 to 4 carbon atoms and Q' is selected from the group consisting of an acryloxypropyl, methacryloxypropyl, vinyl, allyl, hexenyl, acrylamidopropyl, a group represented by the formula

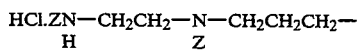

and a group of the formula HCl ZN(H)—CH$_2$CH$_2$—N(H)—CH$_2$CH$_2$CH$_2$—, wherein Z is

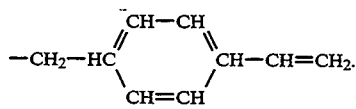

4. The composition according to claim 3, wherein said curing catalyst is selected from the group consisting of a tin (II) carboxylate and a dialkyl tin (IV) carboxylate.

5. The composition according to claim 4, wherein said curing catalyst is stannous octoate.

6. The composition according to claim 5, wherein said silane is gamma-methacryloxypropyltrimethoxysilane.

7. The composition according to claim 6, wherein said component (A) is general purpose polystyrene.

8. The composition according to claim 6, wherein said component (A) is syndiotactic polystyrene.

9. A silicone rubber powder prepared by the steps comprising
   (I) forming an aqueous emulsion consisting essentially of a plurality of particles of a hydroxyl-terminated polydiorganosiloxane having a weight average molecular weight greater than 50,000;
   (II) precuring the polydiorganosiloxane particles within said emulsion with an organotin catalyst and a silane having the general formula:

and partial hydrolysis condensation products thereof to produce an non-cross linked, end-capped polymer, wherein X is a hydrolyzable group selected from the group consisting of alkoxy radicals having 1 to 6 carbon atoms, chloro, hydrido, acetoxy, diorganoamino, oximato and amido groups and in which Q represents a monovalent radical which contains an unsaturated group;
   (III) thereafter co-polymerizing an unsaturated monomer onto said end-capped non-crosslinked emulsion polymer formed in step (II); and
   (IV) harvesting the particles resulting from step (III).

10. The composition according to claim 9, wherein said polydiorganosiloxane is a polydimethylsiloxane which is terminated with a hydroxyl group at each end of its molecule and said unsaturated monomer is a styrenic monomer.

11. The composition according to claim 10, wherein said silane is represented by the formula

in which R' is an alkyl radical having 1 to 4 carbon atoms and Q' is selected from the group consisting of an acryloxypropyl, methacryloxypropyl, vinyl, allyl, hexenyl, acrylamidopropyl, a group represented by the formula

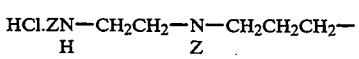

and a group of the formula HCl ZN(H)—CH$_2$CH$_2$—N(H)—CH$_2$CH$_2$CH$_2$—, wherein Z is

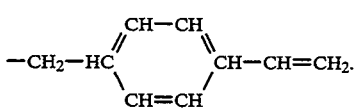

12. The composition according to claim 11, wherein said curing catalyst is selected from the group consisting of a tin (II) carboxylate and a dialkyl tin (IV) carboxylate.

13. The composition according to claim 12, wherein said curing catalyst is stannous octoate.

14. The composition according to claim 13, wherein said silane is gamma-methacryloxypropyltrimethoxysilane.

15. A method for modifying a polystyrene polymer to augment the impact resistance of the polystyrene, by mixing a silicone rubber powder with said polystyrene, said silicone rubber powder being prepared by the steps comprising (I) forming an aqueous emulsion consisting essentially of a plurality of particles of a hydroxyl-terminated polydiorganosiloxane having a weight average molecular weight greater than 50,000;

(II) reacting the polydiorganosiloxane particles within said emulsion with an organotin catalyst and a silane having the general formula:

$$QSi(X)_3$$

and partial hydrolysis condensation products thereof to produce an non-cross linked, end-capped polymer, wherein X is a hydrolyzable group selected from the group consisting of alkoxy radicals having 1 to 6 carbon atoms, chloro, hydrido, acetoxy, diorganoamino, oximato and amido groups and in which Q represents a monovalent radical which contains an unsaturated group;

(III) thereafter co-polymerizing an unsaturated monomer onto said end-capped non-crosslinked emulsion polymer formed in step (II); and (IV) harvesting the particles resulting from step (III).

16. The method according to claim 15, wherein said polydiorganosiloxane is a polydimethylsiloxane which is terminated with a hydroxyl group at each end of its molecule and said unsaturated monomer is a styrenic monomer.

17. The method according to claim 16, wherein said crosslinker is represented by the formula:

$$Q'Si(OR')_3$$

in which R' is an alkyl radical having 1 to 4 carbon atoms and Q' is selected from the group consisting of an acryloxypropyl, methacryloxypropyl, vinyl, allyl, hexenyl, acrylamidopropyl, a group represented by the formula $$HCl.ZN-CH_2CH_2-N-CH_2CH_2CH_2- \\ \phantom{HCl.ZN-CH_2CH_2-}H \phantom{-CH_2CH_2CH_2-}Z$$

and a group of the formula HCl ZN(H)—CH$_2$CH$_2$—N(H)—CH$_2$CH$_2$CH$_2$—, wherein Z is

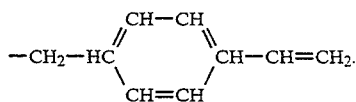

18. The method according to claim 17, wherein said curing catalyst is selected from the group consisting of a tin (II) carboxylate and a dialkyl tin (IV) carboxylate.

19. The method according to claim 18, wherein said curing catalyst is stannous octoate.

20. The method according to claim 19, wherein said silane crosslinker is gamma-methacryloxypropyltrimethoxysilane.

21. The method according to claim 20, wherein said component (A) is general purpose polystyrene.

22. The method according to claim 20, wherein said component (A) is syndiotactic polystyrene.

* * * * *